(12) United States Patent
Fein et al.

(10) Patent No.: US 7,908,303 B2
(45) Date of Patent: Mar. 15, 2011

(54) INTEGRATED DIGITAL MEDIA PROJECTION AND PERSONAL DIGITAL DATA PROCESSING SYSTEM

(75) Inventors: Gene S. Fein, Lenox, MA (US);
Edward Merritt, Lenox, MA (US)

(73) Assignee: Intellectual Ventures Holding 32 LLC, Las Vegas, NV (US)

(*) Notice: Subject to any disclaimer, the term of this patent is extended or adjusted under 35 U.S.C. 154(b) by 861 days.

(21) Appl. No.: 11/733,587

(22) Filed: Apr. 10, 2007

(65) Prior Publication Data

US 2008/0256453 A1  Oct. 16, 2008

(51) Int. Cl.
*G06F 17/30* (2006.01)

(52) U.S. Cl. ........ 707/913; 707/733; 707/734; 707/915; 725/145; 725/152; 709/203; 709/219

(58) Field of Classification Search ................. 707/558, 707/733, 734, 784, 999.107, 758, 913, 914, 707/951; 725/34, 141, 142, 152, 153, 145; 709/203, 219
See application file for complete search history.

(56) References Cited

U.S. PATENT DOCUMENTS

| | | | |
|---|---|---|---|
| 7,466,244 B2 | 12/2008 | Kimchi et al. | |
| 7,796,056 B2 | 9/2010 | Fein et al. | |
| 2002/0138836 A1 | 9/2002 | Zimmerman | |
| 2004/0003398 A1* | 1/2004 | Donian et al. | 725/34 |
| 2004/0021672 A1* | 2/2004 | Wada | 345/591 |
| 2004/0139482 A1* | 7/2004 | Hale et al. | 725/135 |
| 2005/0155070 A1* | 7/2005 | Slaughter | 725/86 |
| 2006/0079214 A1* | 4/2006 | Mertama et al. | 455/414.1 |
| 2006/0238379 A1 | 10/2006 | Kimchi et al. | |
| 2006/0238380 A1 | 10/2006 | Kimchi et al. | |
| 2006/0238381 A1 | 10/2006 | Kimchi et al. | |
| 2006/0238382 A1 | 10/2006 | Kimchi et al. | |
| 2006/0238383 A1 | 10/2006 | Kimchi et al. | |
| 2007/0091118 A1* | 4/2007 | Allen et al. | 345/619 |
| 2007/0103341 A1 | 5/2007 | Kreiner et al. | |
| 2007/0210937 A1 | 9/2007 | Smith et al. | |
| 2007/0233380 A1 | 10/2007 | Tanaka | |
| 2007/0260604 A1* | 11/2007 | Haeuser et al. | 707/9 |
| 2007/0273558 A1 | 11/2007 | Smith et al. | |
| 2008/0064490 A1* | 3/2008 | Ellis | 463/25 |
| 2008/0066106 A1* | 3/2008 | Ellis et al. | 725/40 |
| 2008/0120023 A1 | 5/2008 | Ofek | |
| 2008/0201751 A1* | 8/2008 | Ahmed et al. | 725/109 |
| 2009/0132441 A1* | 5/2009 | Muller et al. | 706/11 |

FOREIGN PATENT DOCUMENTS

| | | |
|---|---|---|
| WO | WO03043332 | 5/2003 |
| WO | WO2004043069 | 5/2004 |
| WO | WO2004105389 | 12/2004 |

OTHER PUBLICATIONS

European Patent Office; PCT International Search Report; Sep. 22, 2008; 4 Pages.

* cited by examiner

*Primary Examiner* — Leslie Wong
(74) *Attorney, Agent, or Firm* — Stolowitz Ford Cowger LLP

(57) ABSTRACT

Disclosed is a projector and data processing method and system for recommending digital media content to a user. The method and system gather statistics about the preferences of the user and/or compare the user to population data to create recommendations in accord with the preferences of the population. The population data may be qualified by demographics or other factors classifying the user. Sources of the digital media content include radio broadcast television broadcast, global computer network content, email, and personal organizing software/programs.

33 Claims, 9 Drawing Sheets

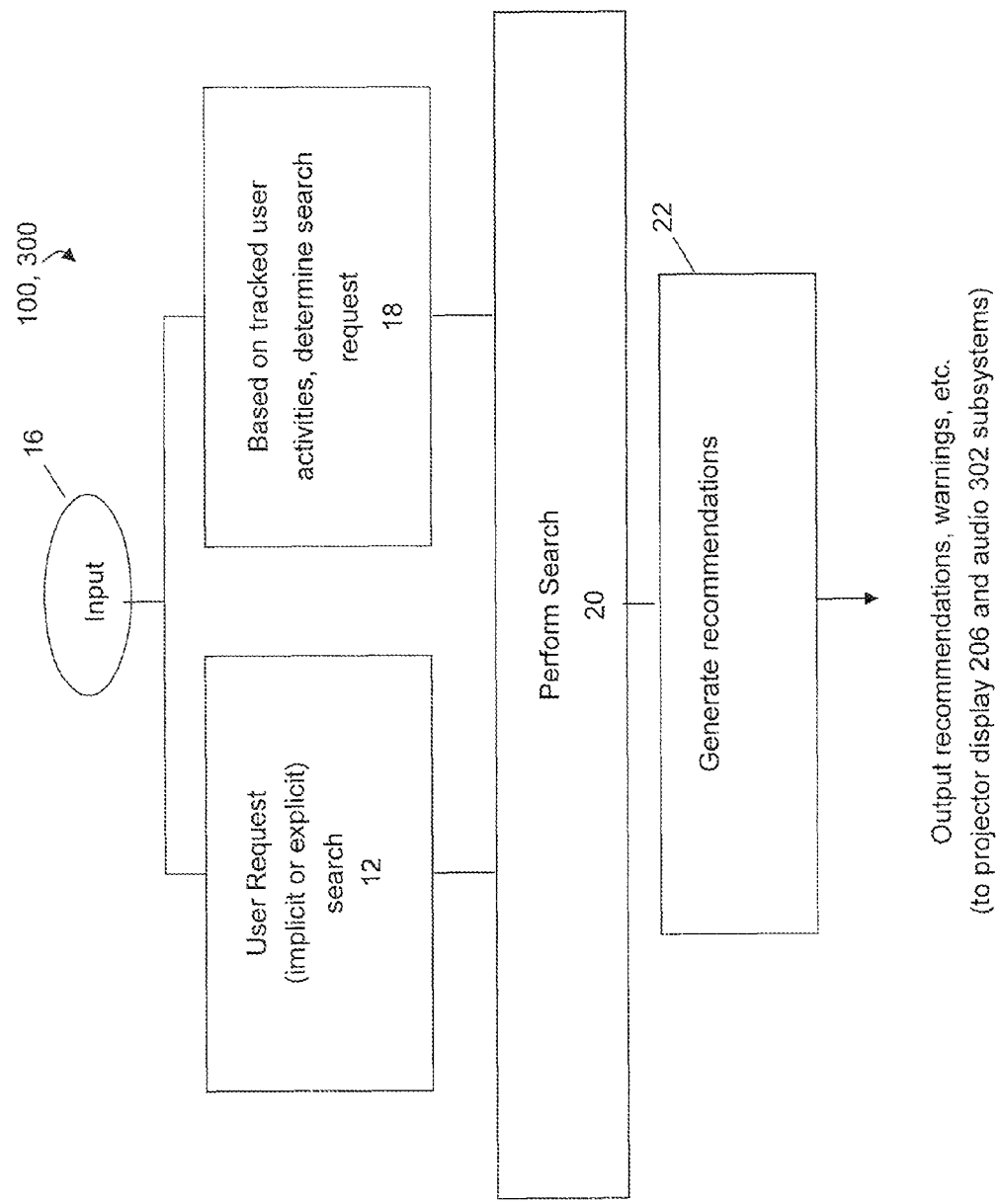

INTEGRATED DIGITAL MEDIA PROJECTION AND PERSONAL DIGITAL DATA PROCESSING SYSTEM

BACKGROUND OF THE INVENTION

It is well known that digital projectors are used to present audiovisual presentations in a business setting. Digital projectors also enjoy an enthusiastic in-home user base that utilizes projectors to watch DVD's, project internet and computer images, and television programming. Digital projectors are also enjoying a growing market share at cinemas where digital films on DVD or large format files stored on hard drives combine with digital projectors to create a more cost efficient way to exhibit films than utilizing the replication of film prints.

Currently, home and business projectors utilize USB ports, and companies such as Epson, Hitachi, Sanyo, Toshiba and NEC all have projectors with wireless access ports on the market today. This enables projectors to connect to the internet via third party devices and too access documents, data streams, and broadcasts as well as personal digital assistant (PDA) information. Each wireless projector unit contains settings that allow for different media sources to gain access via wired and or wireless control to specific data sources through default or selected menu items via the projectors basic user interface system, or buttons on the hardware itself.

Conventional digital projector models address media flexibility and format issues, allowing users to access various media, via wired and wireless ports, on in-home displays, on business displays, and on portable devices.

SUMMARY OF THE INVENTION

Unfortunately, the existing conventional uses for digital projectors have certain limitations in distribution and deployment. The units lack storage, an integrated user interface, and intuitive access to enable a scheduled, mixed and cohesive media display and PDA experience to function as an ongoing media and communication companion based upon the users express and/or implied preferences, in the home, at work or on the go. The projectors also lack the ability to be powered directly by alternative energy sources, such as hand crank, solar or wind, which would benefit the environment and be economically efficient for the user.

Accordingly, there is a need for integrated projection systems that allows for access to and display of digital media content (i.e., any computer program or media capable of display by a computer, such as digital data/media) from different sources has its own large internal hard drive, a simple user interface, multiple wireless connection options. Optionally, such a device could incorporate an advanced Heliodisplay® interface. The system should allow for settings based upon implicit, recommended or express actions creating an environment where communication, learning and entertainment are presented in a schedule and media programming style and availability that are tailored to the individual user's tastes and desires. The system should also be capable of running on clean or alternative energy sources.

The present invention relates to the creation of a data processing system that combines a digital projector with a wireless modem, storage system, audio capacity, calendar, internet access, virtual private network access, voice activation and various means of accessing and exhibiting multimedia programming. The device may be scaled for use on a portable device, a home projector or for larger theatre projectors, for display onto a projector screen, movie screen, portable screen, display monitor unit and the like. Additionally, the device is especially suited to locations where information is displayed in an individualized manner.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9 is a flow diagram of one embodiment.

DETAILED DESCRIPTION OF THE INVENTION

A description of example embodiments of the invention follows.

Figure 1:
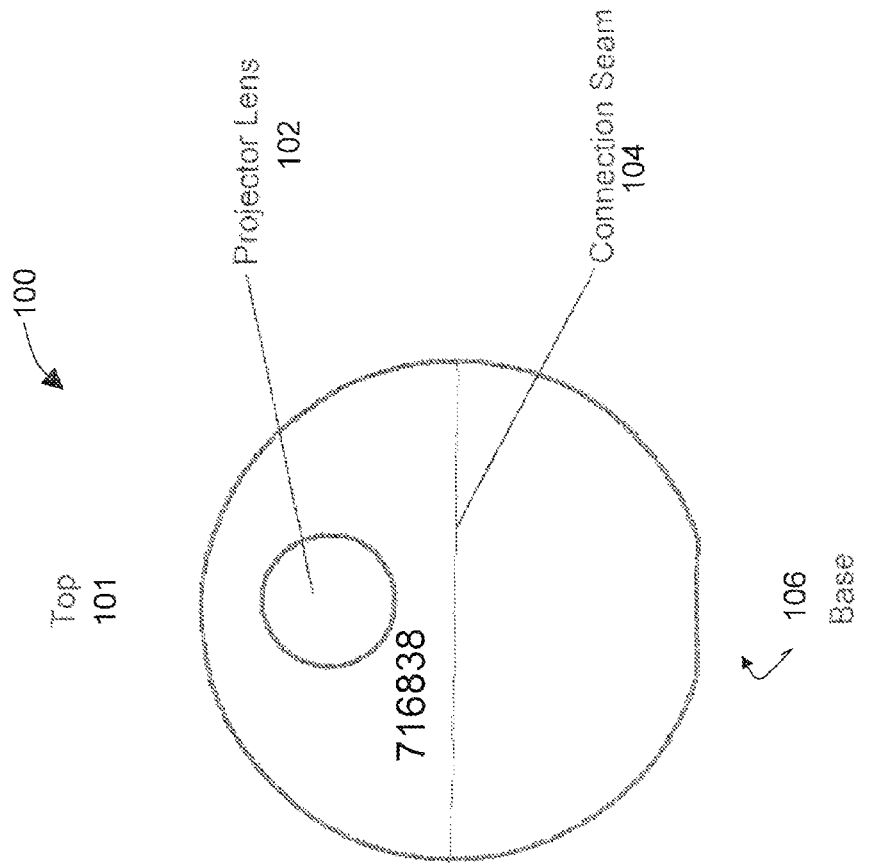
FIG. 1 is a front view of a personal display and digital assistant system of an exemplary data processing system of the present invention.
Figure 2:
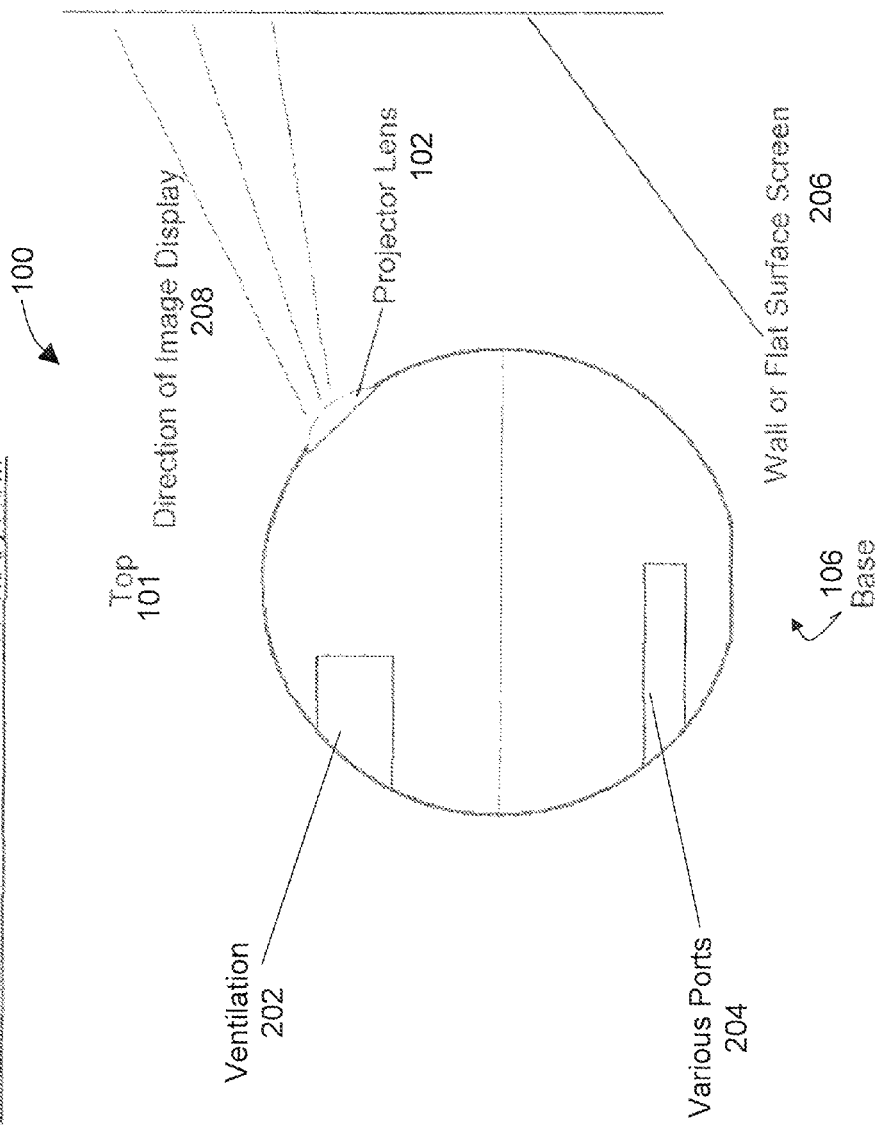
FIG. 2 is a side view of the personal display and digital assistant system of FIG. 1.
Figure 3:
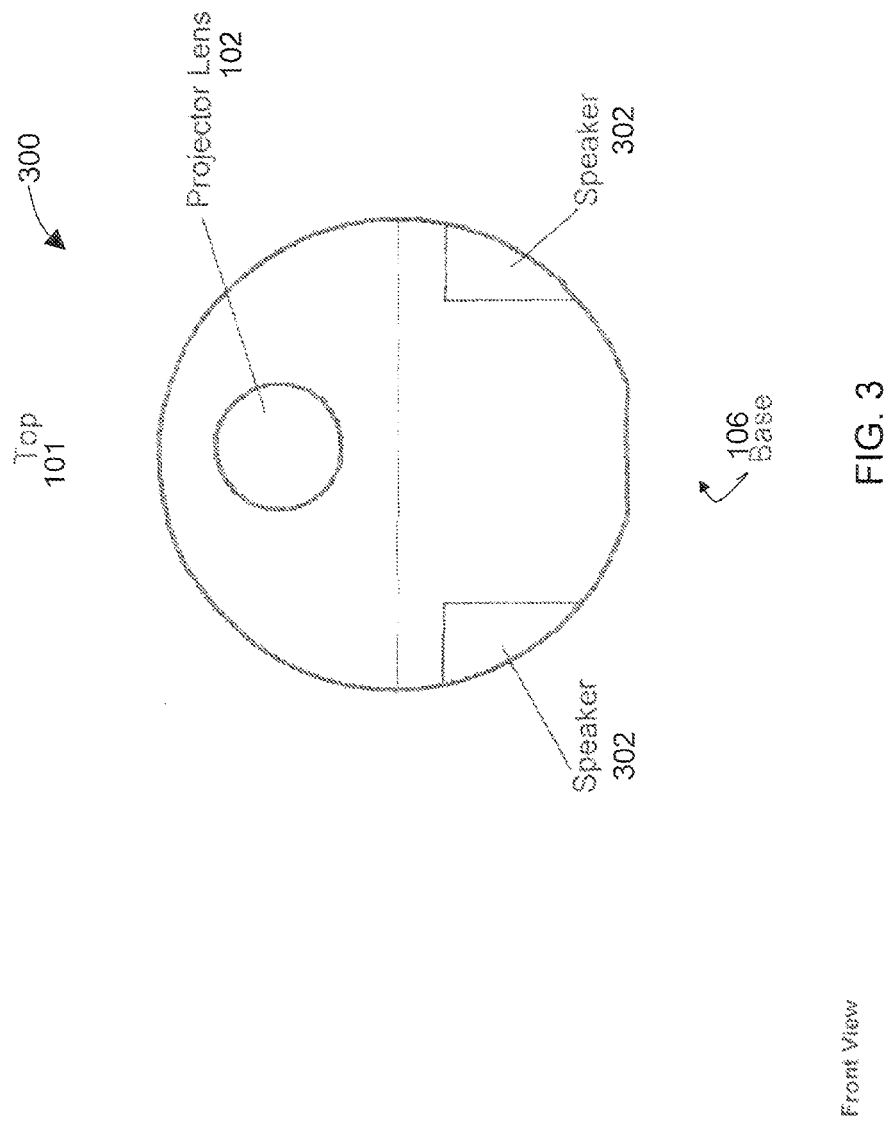
FIG. 3 illustrates an alternative exemplary personal display and digital assistant system of FIG. 1 incorporating audio speakers.

FIGS. 1 through 3 illustrate one possible embodiment of the present invention, in which the image of digital media content is displayed via a projector 100. Digital media content comprises any computer program or media capable of display or rendering by a computer including digital data, digital media, multimedia, audio, text, graphics and the like. Examples of digital media content include, but are not limited to, television broadcasts, radio broadcasts, email and personal organizing software, word processing software, computer network access software, and digital media application software. FIG. 1 shows the invention projector 100 from the front with a projector lens 102 facing forward. The projector 100 is encased in a two-part housing with a seam 104 between the two parts (e.g. top 101 and base 106).

FIG. 2 shows the projector 100 from a side. In FIG. 2, the projector lens 102 is projecting an image 208 onto a wall or other flat (generally planar) surface 206. At the rear of the projector 100, there is a ventilation port 202 and a compartment that houses various input ports 204. The various ports 204 may, for example, include inputs for USB, memory cards, HDMI, BlueTooth®, Wi-Fi, ethernet, modem, or any other connection to support a computer communication standard.

FIG. 3 shows an alternative projector 300 in which audio speakers 302 are located on the projector 300 in addition to the projector lens 102 to enable presentation of sound. Additionally, the projector 100, 300 may be equipped with an internal hard drive (not shown) and computer processor (not shown) to store user inputs, preferences, and media or work data.

While FIGS. 1 through 3 illustrate a projector based device, any type of displays technology may be used, such as cathode ray tubes, liquid crystal displays (LCDs), plasma displays, digital light processing (DLP) displays, organic light emitting diode (OLED) displays, surface-conduction electron-emitter display (SED) displays, and liquid crystal on silicon (LCoS) displays.

The present invention, in accordance with one embodiment relates to the creation of a projection system 100 capable of fusing the elements of a portable digital assistant and a media player utilizing wireless access, storage, USB, BlueTooth®, recommendation technology and the option to power from an alternative energy source, such as hand crank, solar or wind power gathering and conversion modules.

The digital projector system 100, 300 can be set by specific commands from a user. Alternatively, the projector system 100, 300 call be pre-programmed, either fully or partially, by the user. If the projector 100, 300 is only partially programmed, then the remainder of the programming may be determined either by user selection or by a recommendation engine/module (generally subsystem). The recommendation engine is based on a combination of user preferences and outside data used to generate additional recommendation data. A programming system can be a factor of the recommendation engine/module where the recommendation data is based upon any one or a combination of user data, collaborative filtering data and research data.

The projector 100, 300 comes equipped with single or plural microprocessors (not shown) that serve two functions. The first function is to enable handling of the projector's basic mechanical functions, system conditions, power, maintenance and commands. The second function is to synthesize software and external digital media content to organize the digital media content, access the digital media content from various ports, and project the digital media content according to user commands, pre-programming, and the recommendation subsystem. The second function may be further divided between the projector and a processor located at the remote source of digital media content. For example, streaming video may be received from a global computer network 70 (FIG. 7) via a Wi-Fi or ethernet port 204 on the projector 100. The remote computer sending the streaming video has a processor performing a bulk of the processing to transform a digital file into the video stream. The projector 100 processor(s) decodes or decompresses the video stream in this example.

Digital media content may be stored on the device 100, 300 locally via a hard drive (not shown). Digital media content may be accessed via a USB slot 204 which may, be linked directly to a computer with offline capacity that may also route television programming to the projector 100, 300. The USB slot 204 may also be utilized for other remote media players such as iPods® or for portable storage devices such as flash drives. Television programming may also be routed directly via the USB port with the projector 100, 300 enabled with a TV video card to carry this programming.

A high speed wireless card or Wi-Fi receiver/sender 204 may access all of these digital media content elements via any compatible components made to send and/or receive wireless digital media content signals. The same is true for Blue-Tooth® devices such as PDA's, whose information can also be accessed via the aforementioned connections with the external computer.

All of these sources of information can be smoothly accessed via the general user interface software (not shown). This software can present the user interface in Flash, HTML, or other hybrid language to the end user. Each compatible device can be built in to be compatible with the system 100, 300 via C++ programming, JavaScript®, PURL®, database management tools and $3^{rd}$ party hardware and software component application programming interfaces (APIs). The software and hardware API's can enable an inventory of available digital media content to be accessed from the compatible devices via integration and communication via external systems DLL's and file directories. The DLL-based extraction of file directories and corresponding file types are passed through to the main system database which sorts the file directory titles by media type and time of availability, from media scheduled as 'in progress viewing' to media scheduled for 'the end of time'. The available digital media content is then presented as elements of the available media schedule listed in a General User Interface ("GUI"). This media schedule may be located in categories within the GUI such as TV, Music, Movies, PDA, My Schedule and Computing. The GUI is programmed in a preferred language such as Flash with objects selectable from the projector system 100, 300 database directory. The GUI is published as a projected image, on the projector top display, voice activated or operational from a third party device that has installed the system software such as a PDA, iPod® or computer. Once the object is selected in the GUI by the user, by click, touch or voice activation, the corresponding database tag yields a programmed navigation within each file listed from the file directories within the database. This tag displays program title, media variety, length and where the media is stored. After the media element/file has been selected by the user from the GUI, the system 100, 300 then 'reads' the tags on the file that correspond to where the media is stored. If the media is stored on the projector's 100, 300 local hard drive, then it is located and queued to be planted using the media player software stored within the system 100, 300. If the media is available via another port, such as Wi-Fi, USB, wireless card, the system 100, 300 notes this and connects to the applicable hardware through the appropriate port 204. The system 100, 300 is programmed to be compatible with third party hardware to access the file and effectuate the playing of the file from the native third party hardware. The user may elect to then store the digital media content locally on the projector's hard drive as a favorite, or the system 100, 300 may store the digital media content intuitively based upon user preferences and recommendation engine parameters under which the system is programmed to respond.

The aforementioned recommendation subsystem (i.e. a recommendation engine) is software programming that enhances the projector function in a variety of ways. The recommendation subsystem can be used to create recommendations on demand or to create a digital media content schedule that integrates social calendaring work related items, household related items along with media-based programming based upon recommendation system parameters. In a preferred embodiment, the system 100, 300 is built upon a four pronged recommendation engine.

Figure 4:
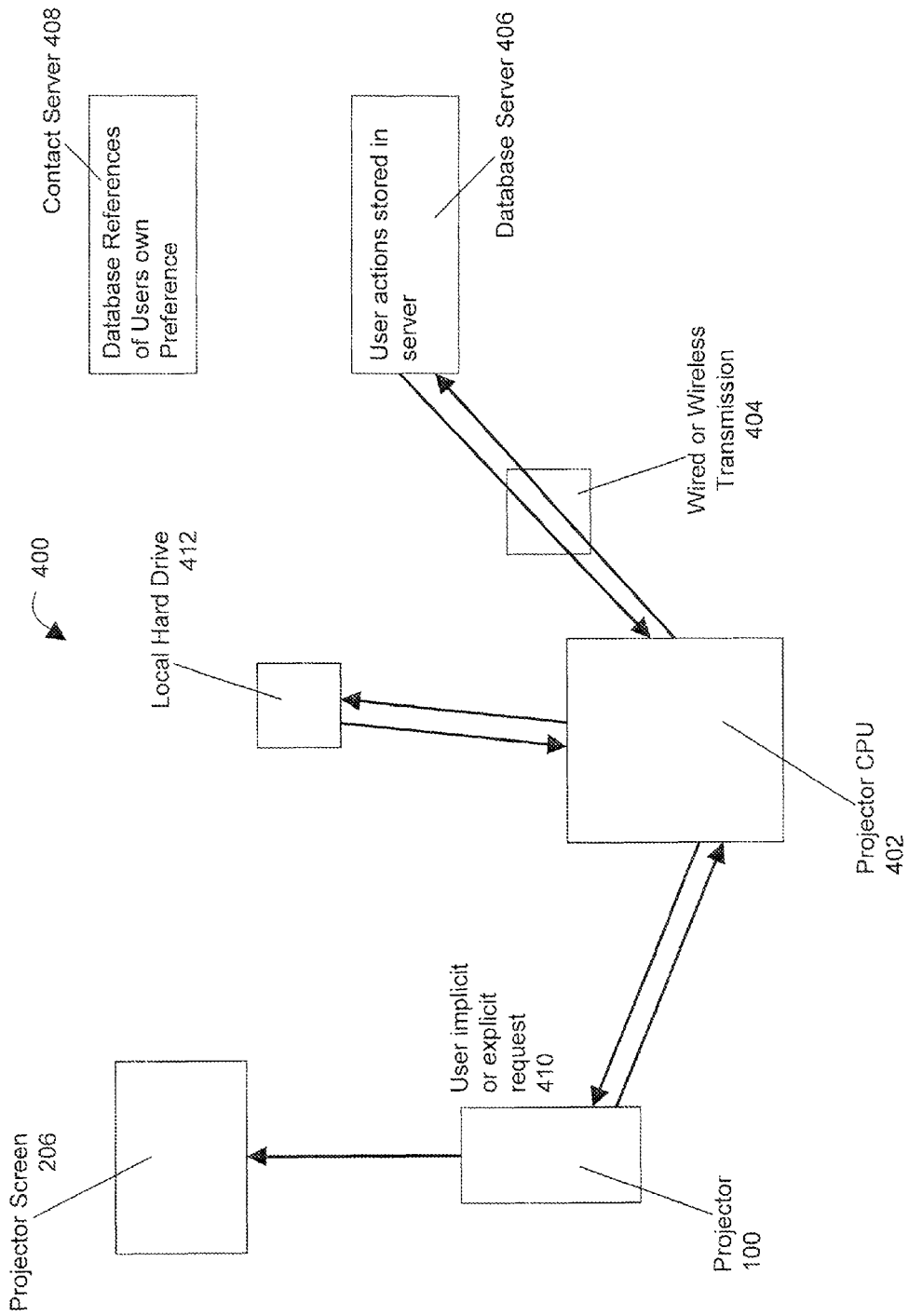
FIG. 4 is a block diagram of a recommendation model of the present invention based on user actions.

As illustrated in FIG. 4, the first prong is based upon user actions 410 that are stored and accounted for by the recommendation engine 400 in accordance with what content and at what time the user utilizes the specific content. This data may be stored on the hard drive 412 of the recommendation subsystem 400 or may be stored in an ancillary remote server 406, accessible via either wired or wireless transmission 404, called upon by the subsystem 400. This data is then configured with the database programming software rules, which are custom programming rules dedicated to presenting the user with the digital media content he wants, at the time the user wants it, without the user asking for the content before it is displayed.

User digital media content viewing is logged via the aforementioned tag system to note in the recommendation database 408 what digital media content is viewed by the user and at what time. After a certain amount of uses from zero to infinity, the user's content viewing habits become recommended programming. For example, if a user plays a morning TV program between 7-7:30 AM three times in a row during the week, then under a database rule, the program becomes a recommendation default setting. The user request model may use any number of repeated requests to trigger the creation of a recommendation default setting. The recommendation program then queues the software via the CPU 402 to go find the programming from the content source/port/hardware and import the content into the recommendation engine 400 as previously described. By using a user's behavior as a primary source, the recommendation subsystem 400 begins to fill in the daily programming schedule of the user. Programming gaps in the schedule may be filled in by one or more methods, alone or in concert.

The second prong utilizes alternate user data obtained by user consent, such as credit card, bills, that describe user patterns, demographic information supplied by the user, questionnaire(s) filled out by the user, data and cookies may be used to clean and store the users online usage patterns. For example, if the user watches the local news every morning, the recommendation subsystem 400 may recommend a local evening news program at 6 PM. in such a way the recommendation subsystem 400 may fill in gaps within the user's schedule.

Figure 5:
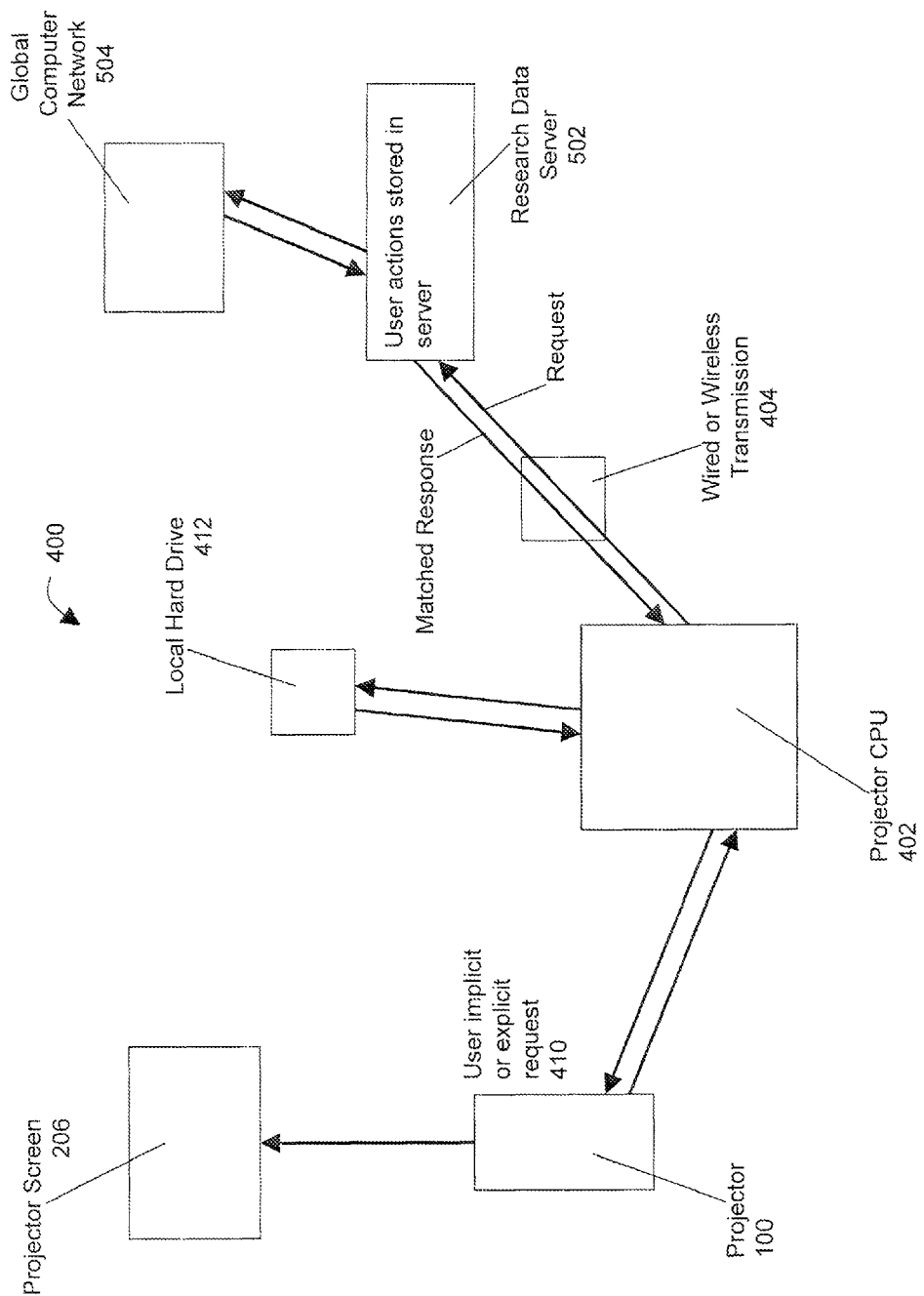
FIG. 5 is a block diagram of a recommendation model of the present invention based on research data.

The third prong utilizes research data to infer the user's preferences (i.e., a user likes movie A; research shows that people who liked movie A also liked movie B, so the invention recommendation engine 400 recommends movie 13 to the user). Based upon research model recommendation engines like TuneGenie.com, a sample of user data is utilized to generate content matches in the system 400 based on the research of industry professionals. This is also a server based platform 502 (FIG. 5) that may be updated based upon new content being made available to the overall system 400. This content may be searchable by the projector system 100 via access to legal sites via a global computer network 504 like iTunes®, a copyright protected version of YouTube™, Napster™, Movielink® and Download.com™, etc. via wired or wireless transmission 404.

Figure 6:
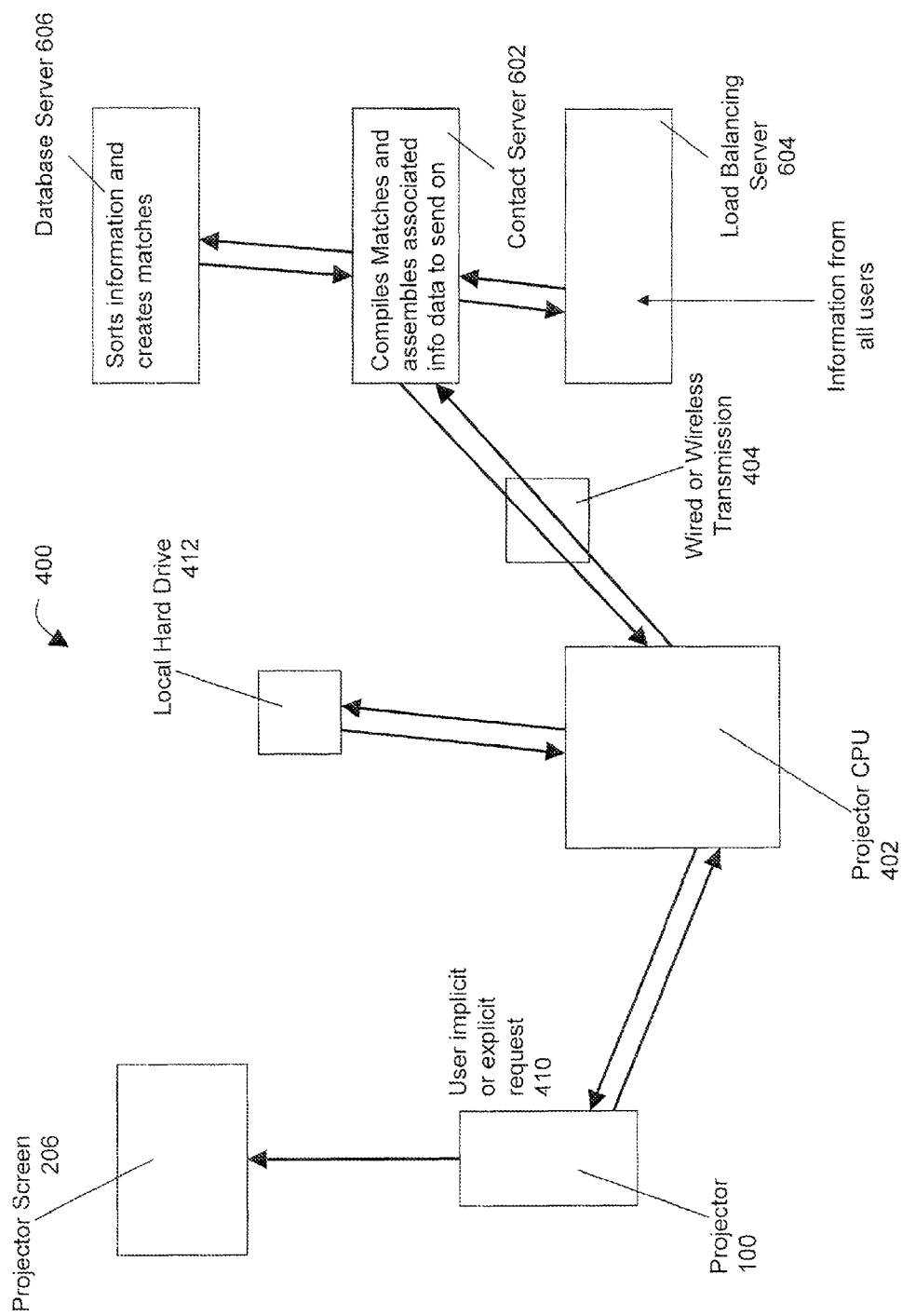
FIG. 6 is a block diagram of a recommendation model of the present invention based on collaborative filtering.

The fourth prong uses collaborative filtering where users of the same service may permit their data to be anonymously gathered in a central database to infer user preferences and offer recommendations. The collaborative filtering member harnesses anonymous user demographics. These demographics and programming information are stored on one set of hard drives 602 (FIG. 6), such as a multi-terabyte raid array. Another set of load balancing servers 604 queue incoming and outgoing queries to the system 400. A third set of servers 606 assigns and matches users and queries, and assigns content recommendations based upon theories of collaborative filtering for users with a certain number of content matches, such as a 25% overall content match rate as logged in the database 606 between each other from projector system 100 use. The user is then recommended content by the collaborative filtering member (software). This is accomplished by a programming engine presenting content recommendations that the user does not have in his list of viewed content 408 within the recommendation engine 400 from another user's list of preferred content based upon their usage of the projector system 100, for example, the user may watch a particular television show every week. The collaborative filtering data may show that other users who watch that particular show also tend to watch a second television show. The recommendation engine 400 may use this collaborative data to recommend the second television show to the user through projector 100, 300.

Before presenting the user with a match, the projector system 100, 300 scans available content to make sure that the match is available. If the match is available, but costs the user a fee, then that is noted by a simple dollar icon or voice activated "pay" prompt by the projector system 100, 300 that gives the user the option to pay, unless the user has set the default to pay for recommended data automatically.

While the four prongs of the recommendation engine 400 have been described separately, several prongs may be used concurrently to offer recommendations to the user. For example, locations the user has requested or visited (the first prong) and purchasing habits of the user (the second prong) may be combined to provide data to a collaborative filtering model (the fourth prong). Furthermore, the recommendation engine 400 may cycle through each of the four prongs.

FIG. 9 illustrates one operating system or processor program 100, 300 embodying the present invention and implementing the foregoing features. Input 16 includes user data (search request pattern, demographic profile, shopping/purchasing patterns, preferences) 402 which is input explicitly or implicitly by the user. The data form implicit or explicit actions that trigger certain search requests as shown at 410 in FIGS. 4-6.

From input 16, invention system 100, 300 determines (at step 12) a user requested search as explicitly input (e.g. via voice activation microphone, keypad, or other input means 106) by the user and/or as implicitly formed by recommendation subsystem 400 tracking user request patterns over time and determining patterns to search. At step 18, system 100, 300 determines search requests based on other user activity and information collected such as described above in the second through fourth prongs of the recommendation engine 400 of FIGS. 4-6.

Next, at step 20, invention system 100, 300 performs the determined search requests from Steps 12 and 18 using database servers 406, 408, 502, 609 and 606 described above. From the results of searches by step 20, step 22 generates digital media content recommendations which are output in a manner suitable for rendering through projector 100, 300 onto screen area 206 and/or through speakers 302 as described above in FIGS. 1-3. The output recommendations include details of recommended digital media such as:
  a description of the digital media content;
  a total time to view or listen to the digital media content;
  advertising related to the digital media content; and
  any other related digital media content.

Figure 7:
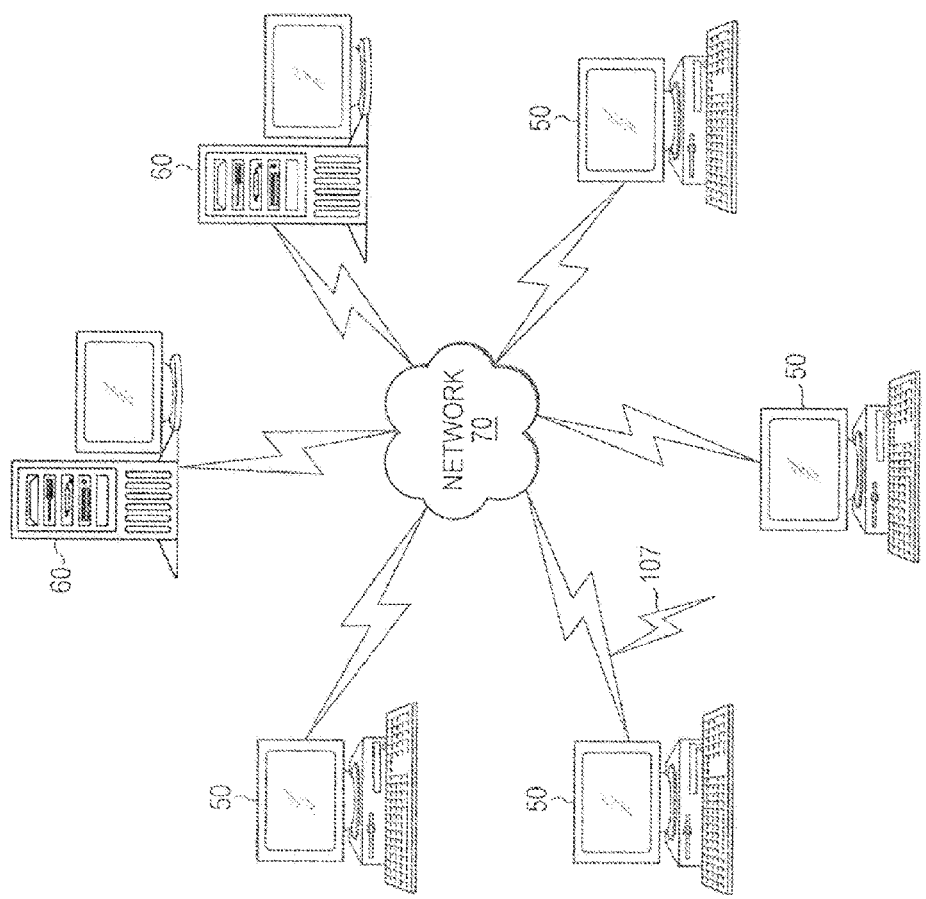
FIG. 7 is a schematic view of a computer network employing an embodiment of the present invention.

FIG. 7 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices//processes 50 and server computer(s) 60. Communications network 70 can be part of a remote access network, a global networks (e.g., the Internet), a worldwide collection of computers, Local area or Wide area network's, and gateways that currently use respective protocols (TCP/IP. BlueTooth®, etc.) to communicate with one another. Other electronic device/computer network architectures are suitable.

Figure 8:
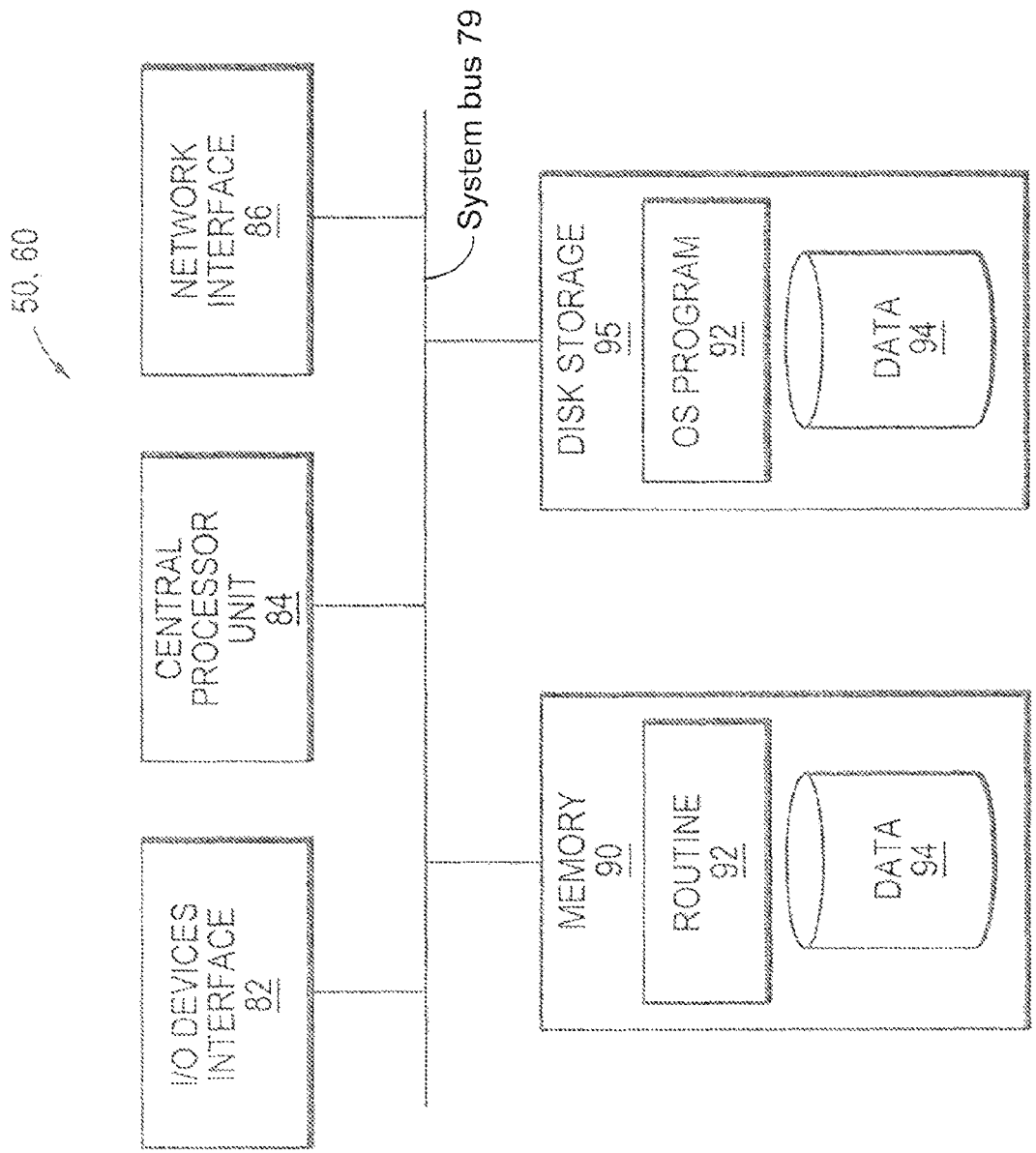
FIG. 8 is a block diagram of a computer node in the network of FIG. 7.

FIG. 8 is a diagram of the internal structure of a computer (e.g., client processor/device 50 or server computers 60) in the computer system of FIG. 7. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory input/output ports, network ports, etc.) that enables the transfer of information between the elements. Attached to system bus 79 is I/O device interface 82 for connecting various input and output devices (e.g., keyboard., mouse, displays, printers, speakers, etc.) to the computer 50, 60. Network interface 86 allows the computer to connect to various other devices attached to a network (e.g., network 70 of FIG. 7). Memory 90 provides volatile storage for computer software instructions 92 and data 94 used to implement an embodiment of the present invention (e.g., recommendation engine 400 and processor program 100, 300 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the inventions system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagation medium, storage medium and the like.

While the invention has been particularly shown and described with references to example embodiments thereof, it will be understood by those skilled in the art that various changes in form and details may be made therein without departing from the scope of the invention encompassed by the appended claims.

For example, computer architecture of FIGS. 7 and 8 are for purposes of illustration and not limitation. Other configurations are suitable. The projector system 100, 300 may be supported by one or plural processors, distributed processing, parallel processing, and other digital processing configurations.

These invention projector systems can be used in tandem, combination or exclusively to design a programming schedule for the user, filling in open times with content which may be a PDA schedule, email, VoIP, work files, entertainment such as a film, music, television, stored pictures and video, online content, or software program access. Interactive items such as a PDA schedule, email or work files call be accessed via the projection system touch screen or mouse system, via a third party device control running the projection system software or via Heliodisplay®. The Heliodisplay® is a free-space display by IO2 technologies. The display uses rear projection to protect images or video onto a nearly invisible plane of transformed air. The image or video appearing to float in mid-air is two-dimensional and non-holographic, though the viewer may perceive a three-dimensional image due to the lack of physical depth reference. The device does not introduce any new materials into the air that do not already exist in the air. According to the inventor, air "moves through a dozen metal plates and then comes out again".

The device can work as a floating touch screen when connected to a PC by a USB cable. With the supplied software installed, one can use a finger, pen, or another object as cursor control and navigate or interact with simple content.

The projector itself may include any existing models in the marketplace, such as a liquid crystal display (LCD), digital light projection (DLP®), and liquid crystal on silicone (LCoS). Systems are coupled with fans, basic CPU's, storage and wireless connections. The variable sizes of the system make them applicable for projection of digital films and live events at digital projection movie theaters. Epson, Hitachi, Sanyo, Toshiba and NEC among others, all have projectors with wireless access ports on the market today. The projectors may also be pocket sized and used as a mobile device. Portable energy gathering and conversion modules, such as solar, wind and hand crank mechanisms can be utilized to gather and convert electricity to the proper state via an inverter to power the projectors using one or more forms of alternative energy in concert. The projectors may be mounted from the ceiling in a kitchen, or other room of a home and utilized entirely via voice command or via wireless notebook PC control.

The system may be used in any place where personal information displays are used. For example, JetBlue® airline incorporates individual LCD television screens into the seatbacks of its aircraft so each passenger may choose what to watch or listen to (each aircraft is connected via satellite dish to DirectTV® and XM® Radio). If a passenger has a subscription to Sports Illustrated® magazine, then the LCD screen at the passenger's seat could be preset to ESPN®. Likewise, if a passenger is twenty-three years old, demographic data may s how that twenty-three-year-olds are most likely to watch MTV®, and the LCD screen at the twenty-three-year-old passenger's seat could be preset to MTV®.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
    a digital projector configured to be powered by an alternative energy source;
    a storage device contained within the digital projector, wherein the storage device is configured to store user-action information associated with user-selected digital media content; and
    a computing component configured to:
        retrieve the user-action information;
        determine a computer-recommended digital media content by comparing digital media content in a database located remotely from the digital projector with the user-action information;
        retrieve the computer-recommended digital media content from the database; and
        forward the computer-recommended digital media content to the digital projector when the digital projector is not projecting the user-selected digital media content.

2. The system of claim 1, wherein the computing component is further configured to determine the computer-recommended digital media content in accordance with preferences of general populations sharing demographics associated with the stored user-action information.

3. The system of claim 1, wherein the computer-recommended digital media content comprises a television broadcast.

4. The system of claim 1, wherein the computing component is further configured to:
    compile the computer-recommended digital media content; and
    provide a graphical display of a schedule of the computer-recommended digital media content to the digital projector.

5. The system of claim 1, wherein the computing component is further configured to:
    log the retrieved computer-recommended digital media content to determine content viewing habits; and
    determine recommended programming based on the content viewing habits.

6. The system of claim 1, wherein the digital projector comprises one or more audio speakers.

7. The system of claim 6, wherein the digital projector comprises a digital light projection (DLP) display.

8. The system of claim 6, further comprising a portable screen.

9. The system of claim 1, wherein the computing component is further configured to retrieve the computer-recommended digital media content via a wireless communication.

10. The system of claim 1, wherein the digital projector comprises a surface-conduction electron-emitter display (SED).

11. The system of claim 1, further comprising an input unit configured to input the user-selected digital media content projected by the digital projector.

12. The system of claim 11, wherein the input unit comprises voice activation.

13. The system of claim 1, wherein the user-action information comprises an accumulation of past user-selections of digital media content.

14. The system of claim 1, wherein the alternative energy source comprises a hand crank, solar energy source, or wind energy source.

15. A method comprising:
    compiling user-action information related to user-selected digital media content, wherein the user-action information is stored in a digital projector;
    evaluating the user-action information by comparison with a collection of digital media content maintained remotely from the digital projector in a computer network;
    retrieving, in response to evaluating the user-action information, one or more recommendations from the collection of digital media content;
    forwarding the one or more recommendations to the digital projector when the digital projector is not projecting the user-selected digital media content; and
    powering the digital projector with an alternative energy source.

16. The method of claim 15, further comprising:
    accessing demographic data on preferences of general populations;
    determining similar digital media content from the collection of digital media content in accordance with the preferences of the general populations; and
    displaying titles of the one or more recommendations having the similar digital media content.

17. The method of claim 16, wherein displaying titles of the one or more recommendations comprises displaying titles of one or more videos.

18. The method of claim 16, further comprising presenting a schedule of transmission of the similar digital media content.

19. The method of claim 15, further comprising projecting the one or more recommendations when the digital projector is not projecting the user-selected digital media content.

20. The method of claim 15, further comprising obtaining the user-action information from voice commands related to the user-selected digital media content.

21. The method of claim 15, further comprising retrieving the one or more recommendations via a wireless communication.

22. The method of claim 15, further comprising projecting the one or more recommendations onto a portable screen.

23. The method of claim 15, further comprising:
    logging the retrieved one or more recommendations to determine content viewing habits; and
    determining recommended programming based on the content viewing habits.

24. The method of claim 15, wherein the recommendations are determined according to a content match rate between the user-action information and the collection of digital media content.

25. The method of claim 15, further comprising:
    retrieving the one or more recommendations from the collection of digital media content; and
    projecting the one or more recommendations from the digital projector.

26. The method of claim 15, further comprising:
    accessing collaborative data based on preferences of third-party users; and
    determining similar digital media content from the collection of digital media content in accordance with the preferences of the third-party users.

27. The method of claim 26, further comprising:
    obtaining demographic information about the user; and
    comparing the demographic information with the collaborative data, wherein the similar digital media content is determined, based in part, on the comparison.

28. The method of claim 27, further comprising:
identifying the similar digital media content that is recommended by the third-party users who have viewed the user-selected digital media content; and
inferring preferences of the user based on the recommendations of the third-party users.

29. A digital projector comprising:
means for compiling viewing preference information related to user-selected digital media content;
means for storing the viewing preference information, wherein the means for storing is located in the digital projector;
means for evaluating the viewing preference information by comparison with a collection of digital media content maintained remotely from the digital projector;
means for receiving, in response to evaluating the viewing preference information, one or more selections from the collection of digital media content;
means for logging the received one or more selections to determine content viewing habits;
means for determining recommended programming based on the content viewing habits;
means for forwarding the recommended programming to the digital projector when the digital projector is not projecting the user-selected digital media content; and
means for powering the digital projector with an alternative energy source.

30. The digital projector of claim 29, wherein the user-selected digital media content comprises social calendaring items.

31. The digital projector of claim 29, wherein the user-selected digital media content comprises work calendaring items.

32. The digital projector of claim 29, further comprising:
means for determining if the recommended programming requires a fee; and
means for requesting payment of the fee before projecting the recommended programming.

33. The digital projector of claim 29, wherein the means for storing comprises means for storing the collection of digital media content remotely from the digital projector.

* * * * *

UNITED STATES PATENT AND TRADEMARK OFFICE
CERTIFICATE OF CORRECTION

| | | |
|---|---|---|
| PATENT NO. | : 7,908,303 B2 | Page 1 of 1 |
| APPLICATION NO. | : 11/733587 | |
| DATED | : March 15, 2011 | |
| INVENTOR(S) | : Fein et al. | |

It is certified that error appears in the above-identified patent and that said Letters Patent is hereby corrected as shown below:

Title page, item (57), under "Abstract", in Column 2, Line 8, delete "broadcast" and insert -- broadcast, --.

Column 10, Line 66, in Claim 27, delete "data ," and insert -- data, --.

Signed and Sealed this
Second Day of August, 2011

David J. Kappos
*Director of the United States Patent and Trademark Office*